(12) United States Patent
Szabela et al.

(10) Patent No.: US 7,484,588 B2
(45) Date of Patent: Feb. 3, 2009

(54) CLOSED CENTER STEERING SYSTEM

(75) Inventors: William A. Szabela, Brookston, IN (US); Thomas J. Toren, West Lafayette, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 472 days.

(21) Appl. No.: 11/247,606

(22) Filed: Oct. 11, 2005

(65) Prior Publication Data
US 2007/0080015 A1    Apr. 12, 2007

(51) Int. Cl.
*B62D 5/06* (2006.01)

(52) U.S. Cl. ........................... 180/417; 180/421

(58) Field of Classification Search .......... 180/417, 180/418, 419, 420, 421, 405, 406, 407
See application file for complete search history.

(56) References Cited

U.S. PATENT DOCUMENTS

| 3,579,984 | A | | 5/1971 | Rohde | |
|---|---|---|---|---|---|
| 4,043,124 | A | | 8/1977 | Weisgerber | |
| 4,476,677 | A | * | 10/1984 | Hanshaw | 60/328 |
| 5,209,317 | A | | 5/1993 | Schnelle | |
| 5,369,583 | A | | 11/1994 | Hazelden | |
| 5,558,177 | A | * | 9/1996 | Inaguma et al. | 180/422 |
| 5,802,949 | A | | 9/1998 | Davis et al. | |
| 6,082,403 | A | | 7/2000 | Strong | |
| 6,122,912 | A | * | 9/2000 | Phillips | 60/413 |
| 6,164,407 | A | | 12/2000 | Cheng | |
| 6,219,603 | B1 | * | 4/2001 | Yamamoto et al. | 701/41 |
| 6,250,416 | B1 | | 6/2001 | Pluschke et al. | |
| 6,474,437 | B1 | * | 11/2002 | Elser et al. | 180/422 |
| 6,547,029 | B2 | | 4/2003 | Peppler | |
| 2004/0188169 | A1 | | 9/2004 | Williams et al. | |

FOREIGN PATENT DOCUMENTS

| DE | 69324954 | 2/2000 |
|---|---|---|
| DE | 1031769 | 3/2005 |
| DE | 10337954 | 3/2005 |

* cited by examiner

*Primary Examiner*—Paul N Dickson
*Assistant Examiner*—Marc A Scharich
(74) *Attorney, Agent, or Firm*—Tarolli, Sundheim, Covell & Tummino LLP

(57) ABSTRACT

A steering apparatus (10) includes a hydraulic power steering gear (130) for turning the steerable wheels (15) of a vehicle. The steering gear (130) includes a closed center valve (150). An electric motor (18) is operatively connected with the steering wheel (12). When activated, the motor (18) resists rotation of the steering wheel (12) to provide steering feel to the vehicle driver and to modulate force applied to the steering wheel (12) upon initial opening of the closed center valve (150).

13 Claims, 2 Drawing Sheets

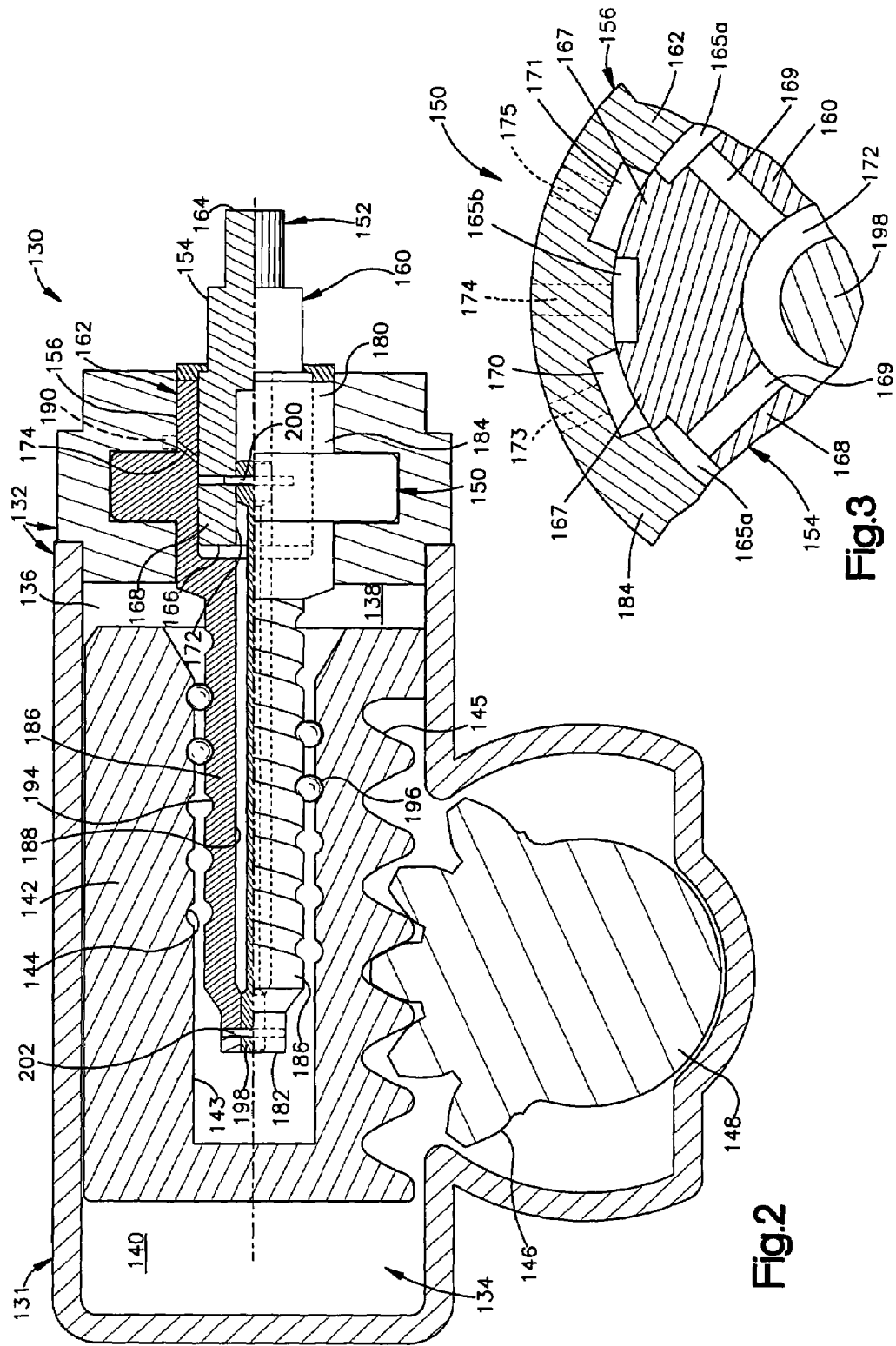

CLOSED CENTER STEERING SYSTEM

TECHNICAL FIELD

The present invention relates to a steering apparatus for a vehicle having steerable road-engaging wheels.

BACKGROUND OF THE INVENTION

Integral hydraulic power steering gears are commonly used in trucks, heavy equipment such as earth-moving vehicles, and construction vehicles. "Integral" refers to a steering gear containing a manual steering mechanism, a hydraulic control valve assembly, and a hydraulic power cylinder integrated into a single unit.

The hydraulic power cylinder typically comprises a chamber divided into two chamber portions by a piston. The piston has a set of teeth which mesh with a sector gear fixed to an output shaft. The output shaft is connected via steering linkage to steerable wheels of a vehicle to steer the vehicle when the output shaft is rotated.

The hydraulic control valve assembly controls flow of pressurized hydraulic fluid between a hydraulic pump and one of the chamber portions to control the direction and amount of steering. One type of control valve assembly includes a closed center valve. In such a system, the hydraulic flow to the two chamber portions is blocked by the valve, when the steering wheel is centered and no steering of the steerable wheels is underway.

The valve assembly typically comprises two relatively rotatable valve elements, one of which is connected to a rotatable input shaft operatively coupled to the vehicle steering wheel. The other valve element is connected with a follow-up member, such as a ball screw drive, which rotates in response to movement of the piston. The ball screw drive provides a direct connection between the input shaft and the piston to allow for manual steering of the vehicle in the event of hydraulic fluid pressure loss.

Associated with the shaft can be an electric motor, which is constructed to resist turning of the shaft by the driver of the vehicle. This resistance provides the driver a steering "feel", if the force from the hydraulic powered gear makes the steering wheel too easy to turn by the driver.

SUMMARY OF THE INVENTION

The present invention relates to a steering apparatus for a vehicle having steerable road-engaging wheels. The apparatus includes a hydraulic power steering gear for turning the steerable wheels of the vehicle in response to rotation of a vehicle steering wheel. The steering gear includes a closed center valve which is operatively connected with the steering wheel. The closed center valve is fluidly connected with a fluid source and a fluid motor for turning the steerable road-engaging wheels.

The closed center valve has an open position allowing the flow of hydraulic fluid from the fluid source to the fluid motor to effect turning of the steerable wheels. The closed center valve has a closed position blocking the flow of hydraulic fluid to the fluid motor from the fluid source when no turning of the steerable wheels is underway. The closed center valve is moved from the closed position to the open position by movement of the steering wheel.

The apparatus also includes an electric motor operatively connected to the steering wheel. When the electric motor is activated, it resists rotation of the steering wheel. This provides steering feel to the vehicle driver and modulates force applied to the steering wheel upon initial opening of the closed center valve.

If desired, the apparatus may include an accumulator for storing high pressure fluid. When the valve is in the open position, hydraulic fluid can flow from the accumulator to the fluid motor to effect turning of the steerable wheels. The valve, when initially opened and initially exposed to the accumulator pressure, transmits a force to the steering column.

BRIEF DESCRIPTION OF THE DRAWINGS

Further features and advantages of the present invention will be apparent to those skilled in the art to which the present invention relates from the following detailed description of preferred embodiments of the present invention made with reference to the accompanying drawings, in which:

FIG. 2 is a cross-sectional view of an integral hydraulic power steering gear which forms a part of the steering apparatus of FIG. 1; and FIG. 3 is a fragmentary schematic sectional view of a closed center control valve which forms part of the integral hydraulic power steering gear of FIG. 2.

DESCRIPTION OF PREFERRED EMBODIMENTS

Figure 1:
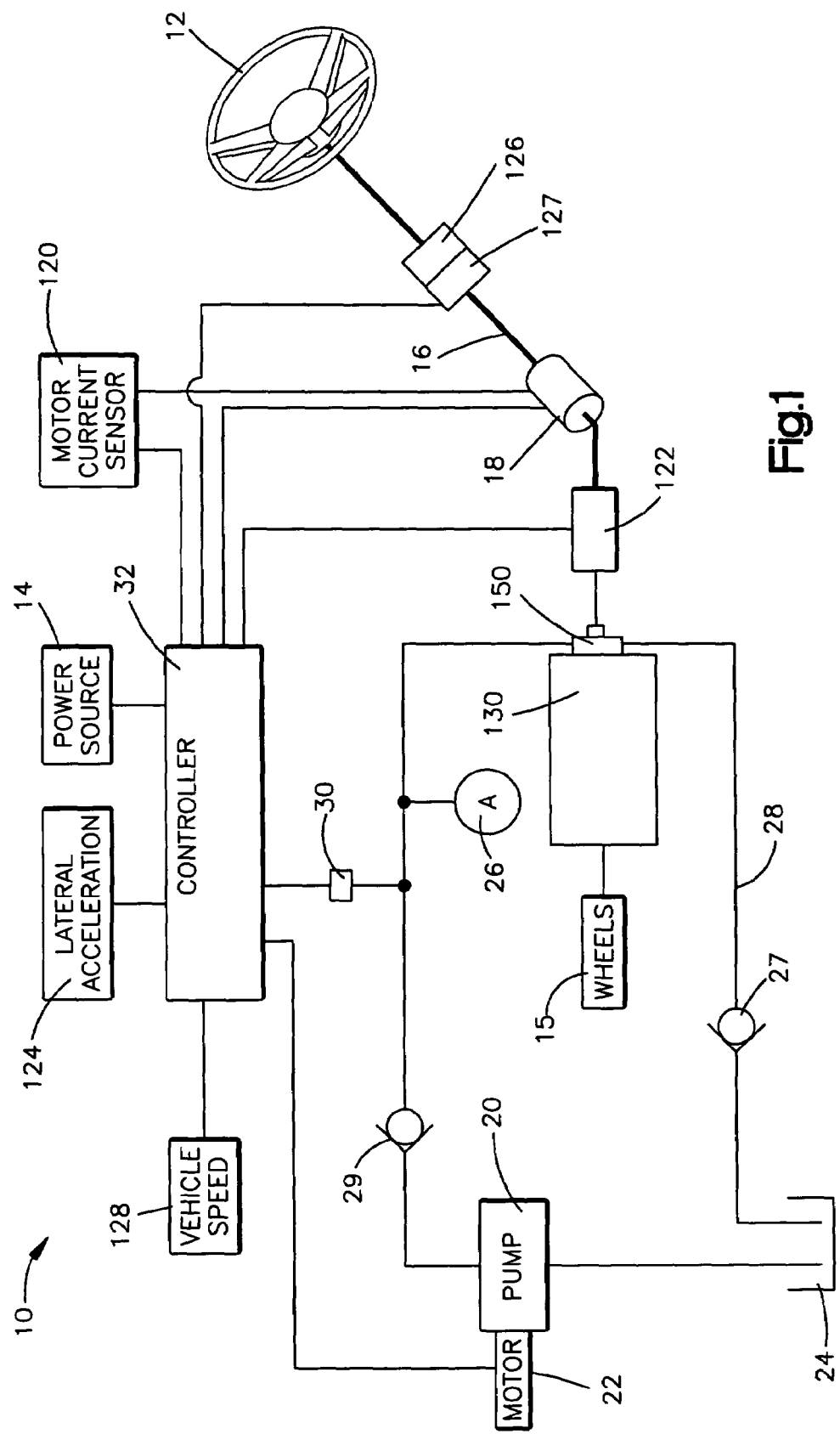
FIG. 1 is a schematic diagram of a steering apparatus embodying the present invention.

FIG. 1 shows a hydraulic power steering apparatus 10 for a vehicle having steerable road-engaging wheels 15. The apparatus includes a steering wheel 12 which is rotated manually by a driver of the vehicle.

Rotation of the hand or steering wheel 12 causes rotation of a shaft 16 (FIG. 1). Associated with the shaft 16 is an electric motor 18 which is activated to provide road feel by resisting turning of the shaft 16 by the driver of the vehicle. The electric motor 18 may be any suitable variable speed reversible electric motor which can resist turning of the shaft 16 when turning the wheel 12 in either a clockwise or counterclockwise direction.

When the electric motor 18 is energized by electric power from a power source 14, the output shaft of the electric motor 18 applies a force to the shaft 16 to provide a steering "feel" to the vehicle operator. This force tends to bias (or drive) the shaft 16 opposite its direction of turning by the vehicle operator.

The apparatus 10 further includes a pump 20. A second electric motor 22 is operatively connected to the pump 20 to drive the pump 20. However, the pump 20 may be driven in a different manner if desired. For example, the pump 20 may be driven by an engine of the vehicle.

The pump 20 has an inlet which is fluidly connected to a reservoir 24. An outlet from the pump 20 is fluidly connected to an accumulator 26 and an integral steering gear 130. A return line 28 from the known integral steering gear 130 is fluidly connected to the reservoir 24. A check valve 27 is provided in the return line 28 to prevent possible backflow of fluid toward the steering gear 130.

When actuated, the pump draws fluid from the reservoir 24 and supplies the fluid to the accumulator 26 via a non-return valve 29. A pressure switch 30 is connected in fluid communication with the accumulator 26. The pressure switch 30 senses the pressure in the accumulator 26.

Referring to FIG. 2, the steering gear 130 is an integral hydraulic steering gear which includes a hydraulic fluid motor 131. A closed center control valve 150 (FIG. 3) directs fluid flow to actuate the hydraulic fluid motor 131 (FIG. 2), as is known in the art.

The integral hydraulic power steering gear 130 includes a two-piece housing 132 having a hydraulic power cylinder 134 (FIG. 2). The power cylinder 134 comprises a chamber 136 divided into two chamber portions 138 and 140, respectively, by a piston 142.

The piston 142 includes an inner bore 143 with a helical groove 144. The piston 142 also has a set of external teeth 145 which mesh with a sector gear 146. The sector gear 146 is fixed to an output shaft 148 which extends outwardly from the housing 132. The output shaft 148 is connected to a pitman arm (not shown) which, in turn, is connected via steering linkage to the steerable wheels to steer the vehicle. As the piston 142 moves in the chamber 136, the output shaft 148 is rotated to operate the steering linkage, which turns the steerable wheels 15 of the vehicle.

A closed center control valve assembly 150 (FIG. 3) controls the flow of pressurized hydraulic fluid between the accumulator 26 (FIG. 1) and one of the chamber portions 138 and 140 to control the direction and amount of steering. The valve assembly 150 (FIG. 2) is actuated by a rotatable input shaft 152. The input shaft 152 is rotated by the shaft 16.

The valve assembly 150 comprises first and second valve members 154 and 156 (FIG. 2), respectively. The first valve member 154 comprises a rotatable valve core 160 (FIG. 3) and the second valve member 156 comprises rotatable a valve sleeve 162. The valve core 160 is located coaxially within the valve sleeve 162 and is supported for rotation by the valve sleeve. The valve core 160 (FIG. 3) is formed integrally as one piece with the input shaft 152 (FIG. 2). The valve core 160 has oppositely disposed first and second axial end portions 164 and 166, respectively, and a valve section 168 between the end portions. The first end portion 164 of the valve core 160 projects beyond the valve sleeve 162 and the second end portion 166 of the valve core lies within the valve sleeve.

The valve section 168 (FIG. 3) of the valve core 160 has a plurality of circumferentially spaced, axially extending grooves 165 disposed between lands 167, as is known in the art. A first plurality of the valve core grooves 165*a* are fluidly connected with an internal axial passage 172 by radial passages 169. The axial passage 172 extends from the valve section 168 of the valve core 160 to the second end portion 166. The internal axial passage 172 communicates via passages (not shown) with the return line 28 (FIG. 1). A second plurality of the valve core grooves 165*b* (FIG. 3) are not connected in direct fluid communication with the internal axial passage 172. The grooves 165*b* are not directly connected with radial passages corresponding to the passages 169.

The valve sleeve 162 (FIG. 2) has oppositely disposed first and second axial ends 180 and 182, respectively. The valve sleeve 162 further includes a sleeve section 184 adjacent the first end 180 and a ball screw section 186 adjacent the second end 182. An axially extending passage 188 extends from the first end 180 of the valve sleeve 162 through the sleeve section 184 and the ball screw section 186 to the second end 182.

The first end 180 of the valve sleeve 162 includes first and second lugs (not shown) that are disposed in diametrically opposed cut-outs (not shown) in the valve core 160. Upon rotation of the valve core 160 of between 2° and 8° relative to the valve sleeve 162, the lugs engage the cut-outs in the valve core to cause the valve sleeve to be rotated along with the valve core. Such rotation of the valve sleeve 162 causes the piston 142 to move axially in the chamber 136 and, hence, allows for manual steering of the vehicle even if a loss in hydraulic fluid pressure has occurred.

The sleeve section 184 of the valve sleeve 162 includes the plurality of passages 174 (FIG. 3) which extend from the outer circumference of the sleeve section to the inner circumference. The passages 174 communicate with a chamber 190 in the housing 132. The chamber is fluidly connected to the hydraulic pump 20.

Axially extending grooves 170 and 171 (FIG. 3) are formed in the inner surface of the valve sleeve 162 as is known in the art. The grooves 170 in the valve sleeve 162 are fluidly connected via passages 173 with the first chamber portion 138 (FIG. 2) in the housing 132. The grooves 171 (FIG. 3) are fluidly connected via passages 175 (FIG. 3) with the second chamber portion 140 (FIG. 2) in the housing 132. As is known in the art, when the valve core 160 is rotated relative to the valve sleeve 162, hydraulic fluid is ported through the grooves and associated passages to one of the chamber portions 138 and 140, while the hydraulic fluid is vented from the other chamber portion, thereby causing the piston 132 to move accordingly.

When the vehicle wheels 15 are in a straight ahead condition, the valve core 160 and valve sleeve 162 are in the closed position illustrated in FIG. 3. At this time, the lands 167 on the valve core 160 cooperate with the valve sleeve 162 to block fluid communication between the pump fluid passage 174 and the motor fluid passages 173 and 175. This results in the valve assembly 150 being a closed center valve assembly. The general construction of the valve assembly 150 and fluid motor 131 is the same as is disclosed in U.S. Pat. No. 5,582,207. However, the valve assembly disclosed in that patent is not a closed center valve.

The ball screw section 186 (FIG. 2) of the valve sleeve 162 includes a helical groove 194 formed on its outer periphery. A plurality of balls 196 are located in the helical groove 140. The balls 196 are also located in the helical groove 144 in the bore 143 formed in the piston 142. As is well known in the art, axial movement of the piston 142 causes the ball screw portion 186 to rotate which, in turn, causes the rest of the valve sleeve 162 to rotate.

A torsion bar 198 (FIG. 2) connects the valve core 160 and the valve sleeve 162. One end of the torsion bar 198 is connected by a pin 200 to the valve section 168 of the valve core 160, while the other end of the torsion bar extends through the passage 188 in the valve sleeve 162 and is connected by a pin 202 adjacent the second end 182 of the valve sleeve.

From the above description it should be apparent that rotation of the steering wheel 12 causes rotation of the valve core 160 of the steering gear 130 relative to the valve sleeve 162. Rotation of the valve core 162 causes axial movement of the piston 142 in one direction or the other. Axial movement of the piston 142 results in rotation of the sector gear and the pitman arm 125, thereby causing the road-engaging steerable wheels 15 to turn laterally of the vehicle.

As illustrated in FIG. 1, the apparatus includes a controller 32 that outputs control signals to the motors to operate them. The controller 32 is powered by the power source 14. The apparatus 10 also includes a plurality of vehicle condition sensors 122, 124, 126, 127, and. 128. The vehicle condition sensors include a column torque sensor 122, a lateral acceleration sensor 124, a hand wheel acceleration sensor 126 and a hand wheel angle sensor 127, and a vehicle speed sensor 128. Each of the sensors 122, 124, 126, 127, and 128 is electrically connected to the controller 32.

The column torque sensor 122 encircles the shaft 16 and senses column torque and outputs a signal indicative of the column torque. The column torque sensor may include a torsion bar between shaft parts and a sensor for sensing relative rotation of the shaft parts. The lateral acceleration sensor 124 senses the lateral acceleration of the vehicle and generates an electrical signal indicative of the sensed lateral acceleration of the vehicle. The hand wheel acceleration sensor 126 and hand wheel angle sensor 127 (which may be the sensor for sensing relative rotation of the shaft parts) senses the magnitude, rate, and acceleration of rotation of the vehicle hand or steering wheel 18 and generates electrical signals indicative of these parameters. The hand wheel rotation magnitude is the angle of rotation of the hand wheel 12 relative to a straight ahead position of the hand wheel. The hand wheel angle sensor 127 senses the rotational position of the hand wheel and generates a signal corresponding to the sensed rotational position of the hand wheel 12.

Rotation of the hand wheel 12 in a first direction may be designated as a positive value and rotation of the hand wheel 12 in a second direction, opposite the first direction, may be designated as a negative value. The hand wheel acceleration sensor 126 and hand wheel angle sensor 127, or the controller 120, may determine the rate of rotation of the hand wheel 12 by taking a time differential of the magnitude and may determine the hand wheel acceleration by taking a time differential of the velocity of rotation. The vehicle speed sensor 128 senses the vehicle speed and generates an electrical signal indicative of the speed.

The apparatus 10 also includes a motor current sensor 120 for sensing the actual current of the electric motor 18 and for providing a motor current signal indicative of the sensed current. The motor current sensor 120 is operatively connected to the controller 32. The controller 32 receives the motor current signal from the motor current sensor 120 and uses the motor current signal to determine the output torque of the electric motor 18. The electric motor 18 is controlled by the controller to provide the proper steering "feel" to the hand wheel 12.

The controller 32 also receives the signals generated by the torque sensor 122, lateral acceleration sensor 124, the hand wheel acceleration sensor 126 and a hand wheel angle sensor 127, and the vehicle speed sensor 128. The controller 32 compares the signals from the sensors to stored reference values. The reference values may take the form of look-up tables stored in the memory of the controller 120. When the comparison indicates that the signals correspond to predetermined, the electric motor 18 is activated by the controller 32 to provide the proper steering "feel" to the hand wheel 12. The controller 32 outputs a control signal to the motors 18, 22.

In operation, when the steering wheel 12 is centered and the steerable wheels 15 are in a straight ahead orientation, the valve assembly 150 is in the closed position. In the closed position, the valve core 160 and valve sleeve 162 are positioned relative to one another so as to block the flow of hydraulic fluid to the chamber 136 of the fluid motor 131 from the accumulator 26. The pump 20 charges the accumulator 26 until the pressure in the accumulator 26 reaches an upper limit as set by the pressure switch 30.

When the user starts to rotate the hand wheel 12 to turn the steerable wheels, the shaft 16 rotates the input shaft 152, which rotates the valve core 160 relative to the valve sleeve 162 to actuate the valve assembly 150 in the open position. In the open position, the grooves in the valve core 160 and valve sleeve 162 are aligned to allow hydraulic fluid to flow from the accumulator 26 through the grooves to one of the chamber portions 138, 140 associated with which way the wheels are turned, while the hydraulic fluid is vented from the other chamber portion. This causes the piston 142 to axially move to assist the steering of the wheels. Axial movement of the piston 142 results in rotation of the sector gear 146 and the pitman arm, thereby causing the road-engaging steerable wheels 15 to turn laterally.

Also, when the closed center valve assembly 150 opens, hydraulic fluid suddenly flows to one of the chamber portions 138, 140. This creates a large initial steering force to the wheels 15 and the steering shaft 16, thereby creating a loss of steering "feel" to the driver. To provide this "feel", the controller 32 sends a control signal based on the signal from the column torque sensor 122 to the motor 18 to increase its output torque and add resistance to the turning of the steering wheel 12. The motor 18 modulates the initial steering force and prevents the force from acting on the steering wheel 12.

After the large initial steering force subsides, the controller 32 sends a control signal to the electric motor 18, which reduces its output torque to that necessary to provide steering "feel" to the vehicle driver during the remaining steering of the steerable wheels 15. The controller 120 further sends a control signal, based on the signals received by the sensors 122, 124, 126, 127, and 128, to the motor 22 of the pump 20. The motor 22 actuates the pump 20 to charge the accumulator 26 during the steering of the wheels 15.

In view of the description above, those skilled in the art will become aware of modifications and changes which may be made in the present invention, and such modifications and changes are intended to be covered by the appended claims.

Having described the invention, what is claimed is:

1. A hydraulic power steering apparatus for a vehicle having steerable road-engaging wheels, said apparatus comprising:
   a hydraulic power steering gear for turning the steerable wheels of the vehicle;
   a rotatable vehicle steering wheel;
   said steering gear including a closed center valve operatively connected with the steering wheel and fluidly connected to a fluid source, and a fluid motor for turning the steerable road-engaging wheels,
   said closed center valve having an open position allowing the flow of hydraulic fluid from the fluid source to the fluid motor to effect turning of the steerable wheels; and
   said closed center valve having a closed position blocking the flow of hydraulic fluid to the fluid motor from the fluid source when no turning of the steerable wheels is underway,
   said closed center valve being moved from said closed position to said open position by movement of said steering wheel; and
   an electric motor operatively connected to said steering wheel for, when activated, resisting rotation of said steering wheel to provide steering feel to the vehicle driver and a controller controlling said motor to modulate force applied to said steering wheel upon initial opening of said closed center valve.

2. The steering apparatus of claim 1 wherein said fluid source includes a pump, a sensor for sensing a rotational position of said steering wheel and for generating a steering wheel position signal corresponding to the sensed rotational position of said steering wheel, said sensor being electrically coupled to said pump, wherein said pump is activated when said steering wheel position signal indicates that said steering wheel is being turned.

3. The steering apparatus of claim 2 wherein said fluid source includes an accumulator for storing high pressure hydraulic fluid, said accumulator being fluidly connected to said pump, said pump supplying hydraulic fluid to said accumulator when activated, wherein hydraulic fluid from said accumulator flows to said fluid motor when said closed center valve is in said open position.

4. The steering apparatus of claim 2 including a pressure switch operatively connected to the accumulator and pump, wherein said pressure switch maintains the pressure in said accumulator between predetermined limits.

5. A hydraulic power steering apparatus for a vehicle having steerable road-engaging wheels, said apparatus comprising:
   a hydraulic power steering gear for turning the steerable wheels of the vehicle;
   a rotatable vehicle steering wheel for effecting operation of said steering gear;
   a fluid source for supplying hydraulic fluid to said steering gear including a fluid accumulator for storing high pressure fluid;
   said steering gear including a closed center valve operatively connected to said steering wheel and fluidly connected to said accumulator, and a fluid motor for turning the steerable road-engaging wheels;
   said valve having a closed position blocking the flow of high pressure hydraulic fluid to the fluid motor from said accumulator when no steering of the steerable wheels is underway and an open position allowing the flow of hydraulic fluid from said accumulator to the fluid motor to effect steering of the steerable wheels;
   said valve, when initially opened and initially exposed to said accumulator pressure, being effective to transmit force to said steering column; and
   an electric motor operatively connected to said steering column and a controller controlling said motor, for when activated, modulating said force and minimizing transmission of said force to said steering wheel, said electric motor also resisting rotation of said steering wheel to provide steering feel to the vehicle driver during steering of the steerable wheel.

6. The steering apparatus of claim 5 including a column torque sensor for sensing the column torque of said steering column and outputting a column torque signal indicative of the column torque, said electric motor providing a predetermined amount of resistance to the rotation of said steering wheel as a function of the column torque signal.

7. The steering apparatus of claim 6 wherein said controller is responsive to the column torque signal for controlling said electric motor to provide a resistance to the rotation of said steering wheel which varies as a function of variations in the column torque signal.

8. The steering apparatus of claim 5 wherein said fluid source includes a pump for supplying hydraulic fluid to said accumulator, said apparatus includes a sensor which senses a rotational position of said steering wheel and generates a steering wheel position signal corresponding to the sensed rotational position of said steering wheel, said controller being connected with said sensor to activate said pump when said steering wheel position signal indicates that said steering wheel is being turned.

9. The steering apparatus of claim 6 wherein said controller sends a control signal to the motor based on the column signal from the column torque sensor to increase an output torque of the motor and add resistance to the turning of the steering wheel upon initial opening of said closed center valve.

10. The steering apparatus of claim 9 wherein said controller sends a control signal to the motor to reduce the output torque of the motor after a steering force caused by the initial opening of said closed center valve subsides.

11. The steering apparatus of claim 1 wherein said controller sends a control signal to the motor to increase an output torque of the motor and add resistance to the turning of the steering wheel upon initial opening of said closed center valve.

12. The steering apparatus of claim 11 wherein said controller sends a control signal to the motor to reduce the output torque of the motor after a steering force caused by the initial opening of said closed center valve subsides.

13. The steering apparatus of claim 11 including a column torque sensor for sensing the column torque of said steering column and outputting a column torque signal indicative of the column torque, said controller being responsive to the column torque signal for controlling said electric motor to provide a resistance to the rotation of said steering wheel which varies as a function of variations in the column torque signal.

* * * * *